Jan. 13, 1970   L. G. WARREN, JR   3,489,141
DENTAL TREATMENT DEVICE
Filed Dec. 29, 1966   2 Sheets-Sheet 1
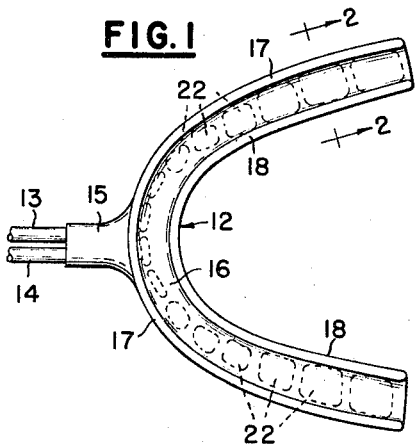
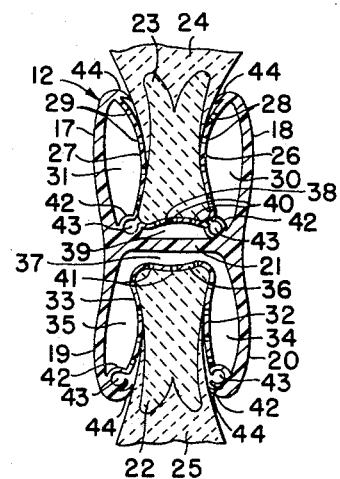
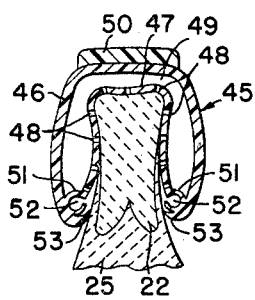
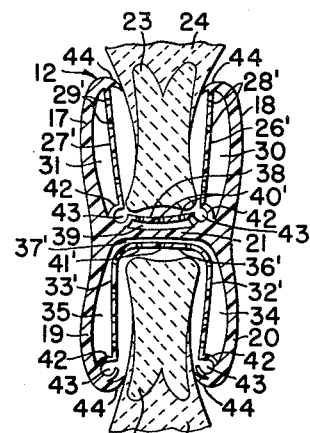
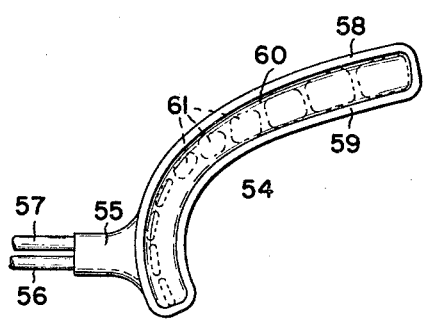
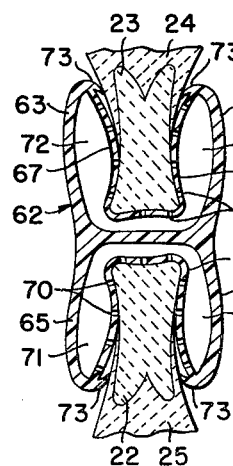
INVENTOR
LAMAR G. WARREN, JR.
BY Ernest Carl Edge

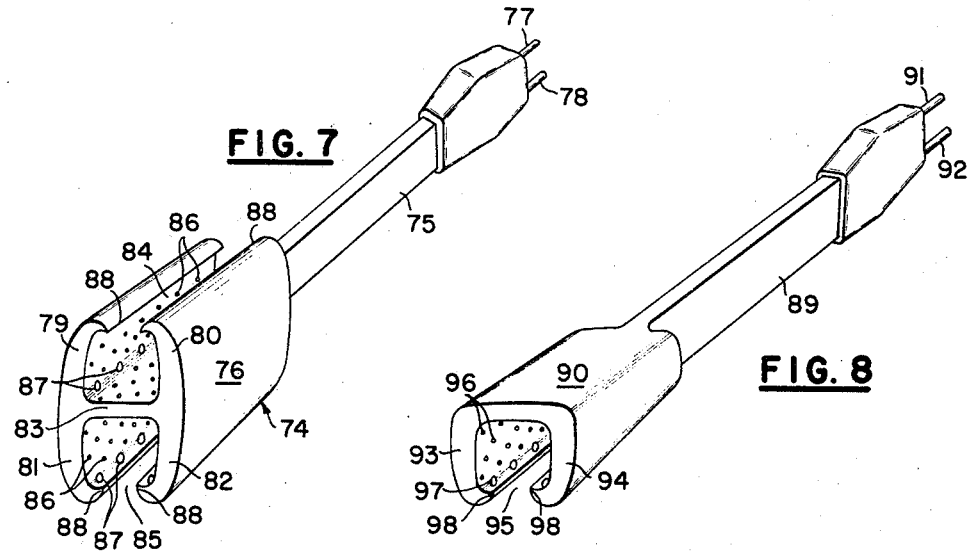
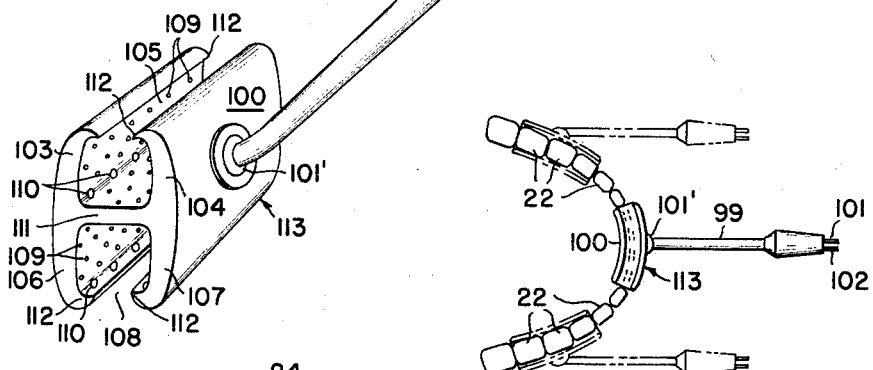
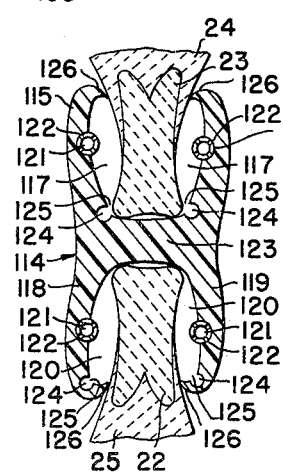

United States Patent Office 3,489,141
Patented Jan. 13, 1970

3,489,141
DENTAL TREATMENT DEVICE
Lamar G. Warren, Jr., 2181 NE. 27th Drive,
Wilton Manors, Fort Lauderdale, Fla. 33306
Continuation-in-part of application Ser. No. 454,348,
May 10, 1965. This application Dec. 29, 1966, Ser.
No. 611,523
Int. Cl. A61h *9/00;* A61m *3/00*
U.S. Cl. 128—66   11 Claims

ABSTRACT OF THE DISCLOSURE

A dental treatment device shaped to fit over at least a portion of the dentition with means to force a fluid material onto the surfaces of the teeth and gums and means to evacuate the fluid from the device.

A retention means is provided which engages the gums and prevents the escape of fluid except through the evacuating means.

---

This application is a continuation-in-part of my copending application Ser. No. 454,348 filed May 10, 1965, now Patent No. 3,379,192.

It is the primary object of my invention to provide an effective dental treatment device which applies fluids under pressure to the surfaces of the teeth and gums and removes the fluid, once it has served its usefulness, from the mouth of the user.

It is a further object of the invention to provide a master dental treatment unit which may be used by a plurality of users with each one having his own personal mouthpieces therefor. It is contemplated that only one pump and supply mechanism be provided for any particular family or group with the individuals each quickly attaching and detaching his individual mouthpiece.

It is a further object of the invention to provide a dental treatment device which incorporates a completely closed system so as to prevent any spilling of water, etc., over the person and surrounding areas during treatment.

It is a still further object of the invention to provide a dental treatment device in which the pressurized fluid used is applied directly to the teeth and gums at extremely close range so as to make the treatment more effective and more efficient.

It is a further object of the invention to provide a treatment device which is equally effective when used with either natural dentition or artificial dentures.

Several embodiments of my invention are shown in the drawing and described below and in each instance a dental treatment device is shown which is made to conform to the general contour of the dental arches or a portion of a dental arch.

Other objects, advantages, and capabilities of my invention will be more apparent from the following description, taken in conjunction with the accompanying drawing, wherein:

FIGURE 1 is a top plan view of a dental treatment device according to my invention;

FIGURE 2 is a cross-sectional view taken substantially on the lines 2—2 of FIGURE 1;

FIGURE 3 is a cross-sectional view of a modification utilizing only one half of the device illustrated in FIGURES 1 and 2;

FIGURE 4 is a cross-sectional view of a device in which the inner walls are rigid and spaced from the dentition;

FIGURE 5 is a top plan view of a modification made to fit over a portion of the dental arches;

FIGURE 6 is a cross-sectional view of a further modification in which the fluid is allowed to drain into the mouth of the user;

FIGURE 7 is a perspective view of a modification of the device;

FIGURE 8 is a perspective view of a still further modification;

FIGURE 9 is a perspective view of another modification;

FIGURE 10 is a top plan view of a dental arch with the device shown in FIGURE 9 illustrating its use thereon;

FIGURE 11 is a cross-sectional view of a further modification;

Referring now to FIGURE 1 of the drawing, mouthpiece 12 is shown as being connected to inlet tube 13 and outlet tube 14 by means of a neck member 15. It is contemplated that inlet 13 and outlet 14 be connected to a multi-purpose pump which pumps fluid into the mouthpiece 12 and also pumps the fluid back from the mouthpiece. If desired the pump may be the type which pumps fluids under pulsating pressure.

The neck 15 is easily attached to and detached from tubes 13 and 14 to provide for interchangeability of mouthpieces.

The top portion of mouthpiece 12 has a continuous channel 16 formed by sides 17 and 18. The purpose of channel 16 is to accommodate the dental arch in the manner shown in FIGURE 2. Teeth 22 of a lower dental arch are illustrated in dotted line in FIGURE 1 to illustrate how the mouthpiece fits over the entire arch.

Referring now to FIGURE 2, the mouthpiece 12 is illustrated as being used on upper teeth 23 which protrude from gum 24 and on lower teeth 22 which protrude from gum 25. An upper channel is defined by the side walls 17 and 18 and a lower downwardly extending channel is defined by the side walls 19 and 20. The two channels are separated by a common wall 21.

Outer wall 18 and inner wall 26 form a manifold 30 along one side of the teeth 23 while walls 17 and 27 form a manifold 31 along the opposite side.

Likewise, walls 20 and 32 form a manifold 34 along one side of teeth 22 while walls 19 and 33 form a manifold 35 along the opposite side. Walls 21 and 36 form a manifold 37 which extends into manifold 34 and 35. Walls 21 and 38 also define a manifold 39 in the upper half of mouthpiece 12.

Wall 26 has a plurality of holes 28 therein, wall 27 has holes 29, wall 38 has holes 40, wall 32 has holes 41, wall 33 has holes 41, and wall 36 has holes 41. The purpose of the holes is to permit fluid to be forced from the various manifolds onto the surface of the teeth and gums.

Located at the bottom of walls 26 and 27 are outlet tubes 42 which extend substantially parallel to manifolds 30 and 31. Tubes 42 have a plurality of openings 43 therein for entrance of the fluid into the outlet tubes. Likewise walls 32 and 33 each have an outlet tube 42 extending along the bottom thereof with openings 43 therein.

Each of walls 17, 18, 19 and 20 have a flexible lip member 44 on the outer ends to provide a closer, more fluid tight fit between the mouthpiece and the gums of the user.

Due to the flexibility of walls 26, 27, 32 and 33 the pressure of the fluid within the manifolds will cause the walls to adapt to the contour of the teeth and gums. In its deflated or non-use state the flexible walls would be spaced from the teeth and gums somewhat like the rigid walls of FIGURE 4 thus permitting easy insertion and removal of the mouthpiece.

The modification shown in FIGURE 3 is for use with a single dental arch, either the upper or the lower but illustrated here as used with a lower arch, and consists essentially of one half of the mouthpiece of FIGURES 1 and 2.

In this embodiment tooth 22 protruding from gum 25 is enclosed by mouthpiece 45 which is comprised of an outer impervious members 46 and an inner member 47 having a plurality of openings 48 therein. The two members 46 and 47 are spaced so as to provide a manifold 49 therebetween with the manifold 49 extending along the sides and top of tooth 22.

Cushion 50 is provided on the top of mouthpiece 45 to rest the upper arch thereon if desired when the mouthpiece is in position in the mouth of the wearer.

Longitudinal drain tubes 51 extend along the bottom of wall 47 and have a plurality of openings 52 therein to permit the fluid to flow or be drawn into tubes 51.

A lip 53 is provided at each side on the bottom of wall 46 to provide a substantially fluidtight fit between the mouthpiece and the gum.

If a single channel mouthpiece such as 45 is to be used for the upper dental arch then it would be substantially the same as the upper half of the mouthpiece 12 of FIGURE 2.

FIGURE 4 illustrates a modification similar to the one shown in FIGURES 1 and 2 with the difference in the two mouthpieces being that walls 26′, 27′, 32′, 33′ and 38′ are inelastic. Due to the rigidity the walls will remain spaced from the teeth for a short distance and the water pumped out through holes 28′, 29′, 36′, 37′, 40′, and 41′ will strike against the surfaces of the teeth and gums.

FIGURE 5 illustrates a modification of a double mouthpiece providing upper and lower teeth-receiving channels. Mouthpiece 54 has a neck member 55 to which inlet tube 57 and outlet tube 56 are detachably connected. Walls 58 and 59 define a channel 60 which is to be placed over a portion of the upper dental arch. Teeth 61 of the lower dental arch fit into the downwardly opening channel.

Due to the fact that mouthpiece 54 is in the shape of a partial dental arch and is used to clean or treat only a part of a dental arch it is easier to insert into the mouth and remove from the mouth.

FIGURE 6 is a modification of my invention in which the pressure evacuation system has been eliminated and once the fluid has been directed onto the tooth and gum surfaces it is permitted to flow into the mouth of the user.

In this embodiment mouthpiece 62 is a double channeled member with outer walls 63 and 64 forming an upper channel and walls 65 and 66 forming a lower channel.

Flexible member 67 with openings 68 therein, along with walls 63 and 64, forming a manifold 72 which completely surrounds the sides and bottom surface of teeth 23.

Likewise walls 65 and 66 combine with flexible member 69 to form a manifold 71 which surrounds the sides and top surface of teeth 22. Member 69 has openings 70 therein to permit the passage of fluid from manifold 71.

Each of walls 63, 64 65 and 66 are provided with a flexible lip 73 on the outer ends thereof to provide a better fit for mouthpiece 62.

FIGURES 7 through 10 illustrate modifications of my device in which only a small section of the dental arch is treated or cleaned at one time and the devices are provided with a handle portion to manipulate the device within the mouth.

In FIGURE 7 the device 74 is shown as comprising a handle portion 75 and a mouthpiece 76. Handle 75 is detachably connected to inlet tube 77 and outlet tube 78.

Walls 79 and 80 form an upper channel 84 and walls 81 and 82 form a lower channel 85. Channels 84 and 85 are separated by common wall 83.

Lining the inside of channels 84 and 85 are a plurality of openings 86 which permit fluid to flow from the mouthpiece into the channels and onto the surfaces of the teeth and gums and a plurality of openings 87 which permit the fluid to flow out of the channels and into drain tubes such as those shown in FIGURES 2 and 3.

Each of walls 79, 80, 81, and 82 are provided with longitudinal flexible lips 88 to provide a more fluid tight fit around the teeth and gums.

In the modification shown in FIGURE 8 handle 89 is connected on one end to mouthpiece 90 and on the opposite end to inlet tube 91 and outlet tube 92. Walls 93 and 94 of mouthpiece 90 form a channel 95 which fits over a section of the dental arch. Openings 96 permit the fluid to flow onto the tooth and gum surfaces and openings 97 permit the fluid to be pumped off into drain outlets and out through outlet 92. Lips 98 provide a close fit around the dental arch.

FIGURE 9 is a modification similar to that illustrated in FIGURE 7 with the added feature of a pivoted handle for easier manupulation. Handle 99 is connected to mouthpiece 100 by means of a universal pivot joint 101′.

Handle 99 is also connected to inlet 101 and outlet 102. Mouthpiece 100 has walls 103 and 104 which form upper channel 105 and walls 106 and 107 which form lower channel 108. Channels 105 and 108 are separated by common wall 111. The insides of channels 105 and 108 have a plurality of openings 109 for the entrance of fluids to the channels and openings 110 for the evacuation of fluids from the channels. Lips 112 on each of walls 103, 104, 106 and 107 provide a close fit for the mouthpiece on the dental arch.

FIGURE 10 illustrates the easy maneuverability of the treatment device 113 shown in FIGURE 9. The mouthpiece 100 is shown as placed over the anterior teeth for cleaning and treatment of teeth 22. After treatment of these teeth the device may be moved along the dental arches to an adjacent position and so forth until all surfaces of the teeth and gums have been cleaned and treated. The dotted line positions illustrated are only two of the locations to which the mouthpiece 100 may be moved with the handle 99 pivoting about joint 101′ to provide easy holding of the device.

FIGURE 11 illustrates a still further embodiment of the invention. Mouthpiece 114 has walls 115 and 116 which form channel 117 and walls 118 and 119 which form channel 120. Channels 117 and 120 are separated by horizontal wall 23.

Each of the walls 115, 116, 118 and 119 are provided with a rotatable fluid inlet member 121 which has a plurality of outlets 122 therein. The incoming fluid being pumped into the mouthpiece is used to rotate the members 121 and as these members rotate the fluid coming out through openings 122 will provide a sweeping action over the teeth and gums. Each of channels 117 and 120 are provided with longitudinal drain members 124 with spaced openings 125 thereon. Lips 126 on the outer ends of each of the walls 115, 116, 118 and 119 provide a substantially fluidtight fit between the mouthpiece and the dental arches.

Having illustrated and described several embodiments of my invention it is to be understood that the many unique features are interchangable in each embodiment. For example, any of the mouthpieces may be either a single unit for treatment of one dental arch or a portion of a dental arch or its may be a double unit for treatment of both an upper and lower dental arch simultaneously or portions of upper and lower dental arches at the same time. Further, any of the units, either single or double, may be provided with the mechanical evacuation system or it may be provided with a drain into the mouth of the user. Likewise, any of the modifications may be provided with flexible, inflatable inner walls or rigid inner walls.

What is claimed is:

1. A dental cleaning and treatment device comprising
    (a) a mouthpiece shaped to fit over at least a portion of the dentition, (b) said mouthpiece providing a channel into which the dentition is received,
(c) said channel having means therein for the application of fluid materials to the teeth and gums,
(d) means for removal of the fluid from the teeth and gum surfaces,
(e) at least one rotatable member within said channel for introduction of the fluid in a sweeping action over the teeth and gum surfaces.

2. A dental cleaning and treating device comprising
(a) a mouthpiece shaped to fit over at least a portion of the dentition,
(b) said mouthpiece providing a channel into which the dentition is received,
(c) said channel having means therein for the application of fluid materials to the teeth and gums,
(d) means for removal of the fluid from the teeth and gum surfaces,
(e) an upwardly extending channel and a downwardly extending channel for receiving at least a portion of an upper dental arch at the same time,
(f) at least one rotatable member within said channel for introduction of the fluid in a sweeping action over the teeth and gum surfaces.

3. A dental cleaning and treatment device comprising
(a) a mouthpiece shaped to fit over at least a portion of the dentition, said mouthpiece providing a channel into which the dentition is received,
(b) retention means at the periphery of said channel for inhibiting the escape of cleaning or treating material from said channel,
(c) apertured inlet means in communication with said channel and adapted to be connected to a source of fluid supply for the application of fluid to the teeth and gum surfaces by flow thereof from said source through said inlet means into said channel, and
(d) apertured outlet means in communication with said channel and adapted to be connected to fluid exhausting means for the removal of fluid from the teeth and gums surfaces and flow thereof out of said channel through said outlet means.

4. A dental cleaning and treatment device as claimed in claim 3 in which said mouthpiece includes at least one manifold extending longitudinally thereof to provide a passageway for the travel of fluid through the same.

5. A dental cleaning and treatment device as claimed in claim 4 in which said manifold has a plurality of apertures therein facing the inside of said channel.

6. A dental cleaning and treating device as claimed in claim 5 in which said manifold has a flexible inner wall.

7. A dental cleaning and treatment device as claimed in claim 5 in which said manifold has a rigid inner wall.

8. A dental cleaning and treatment device as claimed in claim 5 in which said outlet means includes an apertured manifold inside and extending longitudinally of said channel, said first named manifold being part of said inlet means.

9. A dental cleaning and treatment device as claimed in claim 3 wherein a handle is attached to said mouthpiece.

10. A dental cleaning and treatment device as claimed in claim 3 in which said mouthpiece provides a first channel extending upwardly and a second channel extending downwardly for receiving at least a portion of an upward dental arch and a lower dental arch at the same time, each of said channels having said retention means at the periphery thereof, said apertured inlet means communicating with both of said channels and said apertured outlet means also communicating with both of said channels.

11. A dental cleaning and treatment device as claimed in claim 3 in which said inlet means comprises a single inlet and said outlet means comprises a single outlet.

References Cited

UNITED STATES PATENTS

| 803,475 | 10/1905 | Dennis. | |
| 1,500,107 | 7/1924 | Chandler | 128—239 |
| 3,379,192 | 4/1968 | Warren | 128—66 |

FOREIGN PATENTS 601,921   2/1960   Italy.

L. W. TRAPP, Primary Examiner

U.S. Cl. X.R.

128—241